United States Patent
Goebel et al.

(10) Patent No.: US 6,362,775 B1
(45) Date of Patent: Mar. 26, 2002

(54) PRECISION ALL-WEATHER TARGET LOCATION SYSTEM

(75) Inventors: Robert H. Goebel, Wildwood; Stacie K. Corrubia, Town and Country, both of MO (US)

(73) Assignee: McDonnell Douglas Corporation, Seattle, WA (US)

(*) Notice: Subject to any disclaimer, the term of this patent is extended or adjusted under 35 U.S.C. 154(b) by 0 days.

(21) Appl. No.: 09/558,015

(22) Filed: Apr. 25, 2000

(51) Int. Cl.[7] .......................... G01S 13/06; G01S 13/90
(52) U.S. Cl. ............................. 342/64; 342/25; 342/59; 342/61; 342/62; 342/63; 342/89; 342/90; 342/175; 342/194; 342/195
(58) Field of Search ................. 342/25–28, 59–66, 342/89, 90, 175, 176, 179, 180, 188–197

(56) References Cited

U.S. PATENT DOCUMENTS

| | | |
|---|---|---|
| 3,731,310 A | 5/1973 | Ritenbach |
| 4,103,302 A | 7/1978 | Roeder et al. |
| 4,106,017 A | 8/1978 | Roeder et al. |
| 4,359,732 A | 11/1982 | Martin |
| 4,635,060 A | 1/1987 | Mertens .................. 342/191 |
| 4,682,175 A | 7/1987 | Lazarus .................. 342/165 |
| 4,717,916 A | 1/1988 | Adams et al. ........... 342/107 |
| 4,922,254 A | 5/1990 | Schuessler et al. ....... 342/25 |
| 5,170,171 A | 12/1992 | Brown .................... 342/191 |
| 5,185,608 A | 2/1993 | Pozgay ..................... 342/17 |
| 5,260,708 A | 11/1993 | Auterman ................. 342/25 |
| 5,332,999 A | 7/1994 | Prati et al. ............... 342/25 |
| 5,424,742 A | 6/1995 | Long et al. ............... 342/25 |
| 5,424,743 A | 6/1995 | Ghiglia et al. ............ 342/25 |
| 5,448,241 A | 9/1995 | Zeoli et al. ............... 342/25 |
| 5,488,374 A | 1/1996 | Frankot et al. ........... 342/25 |
| 5,489,907 A | 2/1996 | Zink et al. ............... 342/25 |
| 5,495,248 A | 2/1996 | Kawase et al. ........... 342/25 |
| 5,608,405 A | 3/1997 | Pritt ........................ 342/25 |
| 5,659,318 A | 8/1997 | Madsen et al. ........... 342/25 |
| 5,677,693 A | 10/1997 | Frankot et al. ........... 342/25 |
| 5,680,138 A | 10/1997 | Pritt ........................ 342/169 |
| 5,726,656 A | 3/1998 | Frankot .................... 342/25 |
| 5,867,119 A | 2/1999 | Corrubia et al. ......... 342/120 |
| 6,011,505 A * | 1/2000 | Poehler et al. ............ 342/25 |

* cited by examiner

Primary Examiner—Bernarr E. Gregory
(74) Attorney, Agent, or Firm—Bryan Cave LLP

(57) ABSTRACT

An apparatus to determine the three-dimensional location of an airborne platform relative to a target area using two separate antenna assemblies positioned on the airborne platform. The first antenna assembly is adapted to transmit energy downward toward a surface location directly beneath the airborne platform, while the second antenna assembly is adapted to transmit energy forward towards the target area remote from the surface location. A single transmitter is associated with both of the antenna assemblies for transmitting signals toward the surface location and the target area. A receiver coupled to the antenna assemblies receives and detects the signals corresponding to the transmitted energy as reflected by the target area and the surface location. A radar processor is coupled to the receiver and is adapted to determine the range between the airborne platform and the surface location and determine the three-dimensional height of the target area from the detected signals. The radar processor also extracts two-dimensional gray scale imagery of the target area from the detected signals. The apparatus also incorporates three geolocated stored references, one of terrain heights of the surface location and target area, one of the intensity image of the surface location, and the third of two-dimensional gray scale imagery of the target area. A height correlator compares the elevation measurements produced by the both the downward and forward looking platform sensors to the stored reference of terrain heights. The intensity of the radar return is also matched with a stored reference of intensities of the surface area. An image correlator for matching the extracted gray scale imagery of the target area to the stored reference of gray scale imagery is provided. A navigational processor then determines the three-dimensional location of the platform relative to the target area based on the correlation results of the height correlator and the image correlator.

8 Claims, 2 Drawing Sheets

PRECISION ALL-WEATHER TARGET LOCATION SYSTEM

FIELD OF THE INVENTION

The present invention relates generally to airborne navigational systems and, more particularly, to devices and methods to determine the location of an airborne vehicle relative to a target area. Most particularly, the present invention relates to a system for determining the location between an airborne vehicle relative to a target area which operates without the need for aiding from the Global Positioning System (GPS) and is operable in all-weather.

BACKGROUND OF THE INVENTION

Conventionally, various approaches exist to determine the three-dimensional geolocation of an airborne vehicle (for example, an aircraft or a missile) relative to a particular target. The target may be an airport, landing strip, bombing target, power plant or other high value fixed targets. Most conventional approaches operate with the aid of an inertial navigation system (INS) or use various aiding devices, sensors, and receivers, such as GPS receivers. These existing systems provide updates to navigational systems and terminal guidance and rely heavily on information obtained through the aiding devices. As is known, the operational capability of these aiding devices degrades with adverse weather conditions. Also, GPS signals are vulnerable to jamming.

To date, the only known devices that meet the requirements of precision, all-weather, GPS-independent guidance are synthetic aperture radars (SAR). Most existing SARs are two-dimensional, forward-looking devices (with a squint angle), which do not extract elevation data and do not have a downward-looking mode. As an example, one SAR is known as the HAMMERHEAD radar system, which is a radar system being developed by Raytheon Corporation. The slant range position of a particular target location can be determined by measuring the time delay between transmitting and receiving of an electromagnetic pulse and the Doppler frequency of the returns. Digital signal processing techniques may then be used to produce high-resolution, two-dimensional image maps of the target area.

An improved SAR, known as an interferometric SAR (IFSAR), uses two spatially displaced antennas. The dual antenna interferometric SAR is capable of obtaining information related to altitude, thus producing three-dimensional topography maps of the target area as well as an associated, co-registered gray-scale intensity image. Such three-dimensional information is obtained using the known location of the airborne vehicle hosting the interferometric SAR obtained from an independent source such as GPS units. An improved position locating device is described in U.S. Pat. No. 5,867,119, incorporated herein in its entirety for all purposes, which can be used to provide automatic position location for a moving airborne vehicle by correlating a sensed array of altitudes with a stored terrain reference. This improved system eliminates the need for an independent location reference.

There is, however, a continuing need to determine the location of an airborne platform relative to a target area. A preferred system would determine such location based on both relative terrain height information and gray-level imagery. The system would provide precision guidance in all weather without the aid of GPS information and would preferably integrate the features of midcourse navigation update and terminal guidance into a single system. The preferred system would reside on a moving airborne vehicle or platform and would provide the location of a target or target area relative to the airborne vehicle.

SUMMARY OF THE INVENTION

The present invention provides an integrated system for determining the location of a target area relative to an airborne vehicle. The invention incorporates an interferometric synthetic aperture radar to sense both three-dimensional location information and two-dimensional gray scale intensity information relative to the target area and compares such information with previously-stored references of similar information to locate the target area. The comparison results in a geometric location of the airborne vehicle and assists the airborne vehicle in guidance toward the target area.

In a preferred embodiment, the present invention includes an apparatus to determine the three-dimensional location of an airborne platform relative to a target area using two separate IFSAR antenna assemblies positioned at the airborne platform. The first antenna assembly is adapted to transmit energy downward toward a surface location directly beneath the airborne platform, while the second antenna assembly is adapted to transmit energy forward towards the target area with a squint angle in azimuth and elevation relative to the velocity vector. A single transmitter is shared between the two antenna assemblies for transmitting signals toward the surface location and the target area at non-overlapping intervals. A single receiver coupled to the antenna assemblies receives and detects the signals corresponding to the transmitted energy as reflected by the target area and the surface location. A radar processor is coupled to the receiver and is adapted to determine the range between the airborne platform and the surface location and determine the three-dimensional height of the target area from the detected signals. The radar processor also extracts gray scale imagery of the target area from the detected signals. The apparatus also incorporates a set of geolocated stored references for each of the antenna assemblies. The reference sets consist of three-dimensional maps of terrain heights and their associated co-registered gray scale images of both the surface location and target area. A height correlator compares the elevation measurements produced by the platform sensors from both the downward and forward looking sensors to the stored reference of terrain heights. Also, an image correlator for comparing the extracted gray scale imagery of the target area to the stored reference of gray scale imagery is provided. A navigational processor then determines the three-dimensional location of the platform relative to the target area based on the correlation results of the height correlator and the image correlator.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

Figure 1:
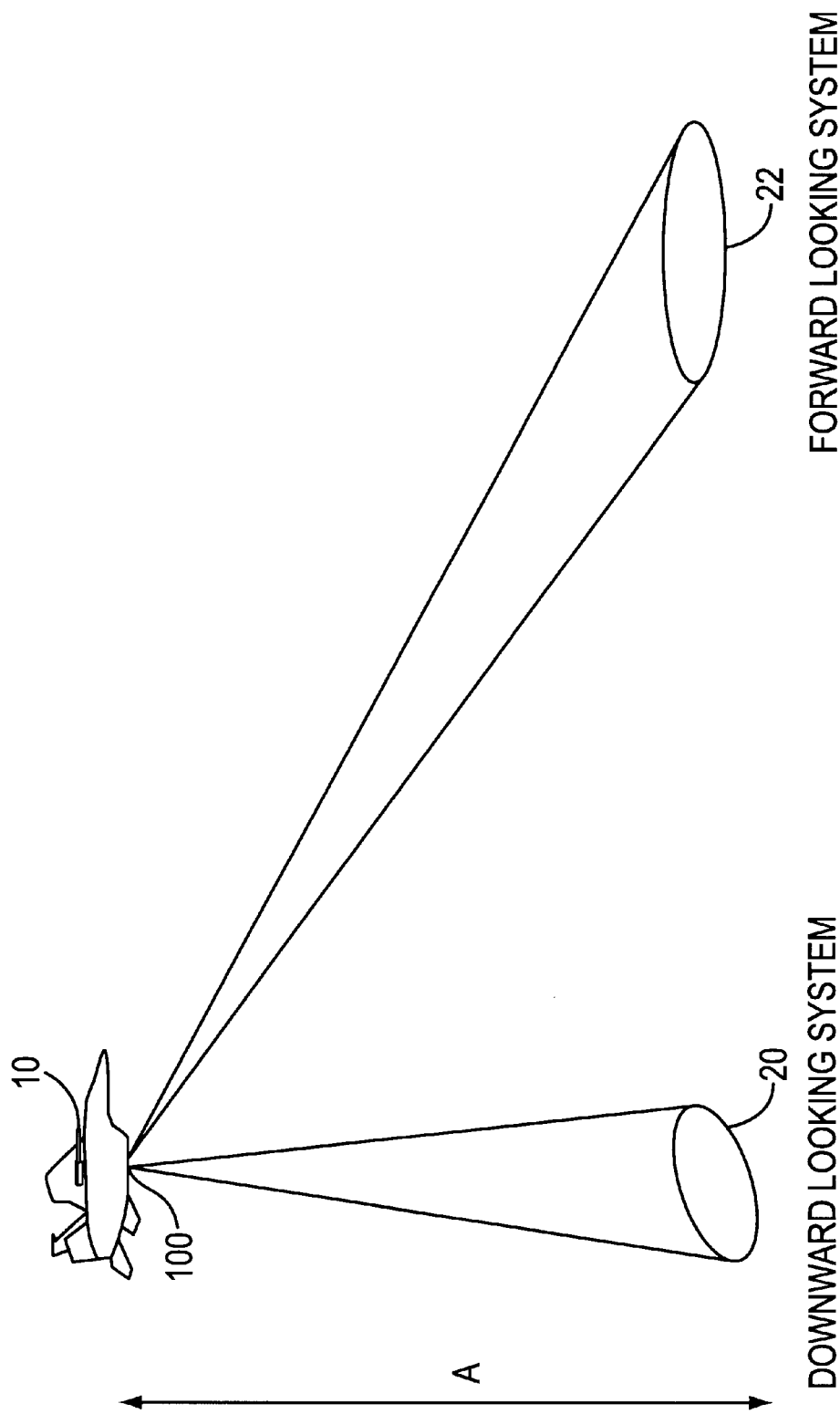
FIG. 1 is a graphical illustration showing the apparatus of the present invention located on an airborne vehicle flying over a surface location and illuminating both the surface location and a target area.

FIG. 1 illustrates the principles of the present invention and shows an airborne platform 10, which can be an aircraft, missile or spacecraft, flying directly above a surface location 20 at a measured barometric altitude A. The airborne platform 10 is carrying a radar-based apparatus 100, which, as described below, includes two spatially displaced separate antenna assemblies. A first antenna assembly is oriented in a downward direction toward the surface location 20 directly beneath the airborne platform 10 and is used to determine the three-dimensional position of the airborne platform 10 relative to the target area 22. A second antenna assembly is oriented forward-looking towards a target area 22 and is used to determine the three-dimensional position of the airborne platform to the target area 22. The target area 22 may include any form of target strike area, or may include an airport or landing runway, or cultural features.

Both the first and second antenna assemblies are used to transmit microwave energy to the surface location 20 and the target area 22, respectively, and are used to receive and measure the returned energy reflected from the surface location 20 and the target area 22. A radar system, such as an interferometric synthetic aperture radar, comprises both antenna assemblies and preferably incorporates a transmitter/receiver that is capable of extracting both doppler and crosstrack angle of the detected energy. The energy transmitted and received by the antenna assemblies may be used to extract both three-dimensional terrain heights and/or two-dimensional gray-level images of the surface location 20 and the target area 22. This information may then be matched to a geolocated, stored reference of terrain heights and gray scale imagery to locate the airborne vehicle 10 relative to the target area 22.

Figure 2:
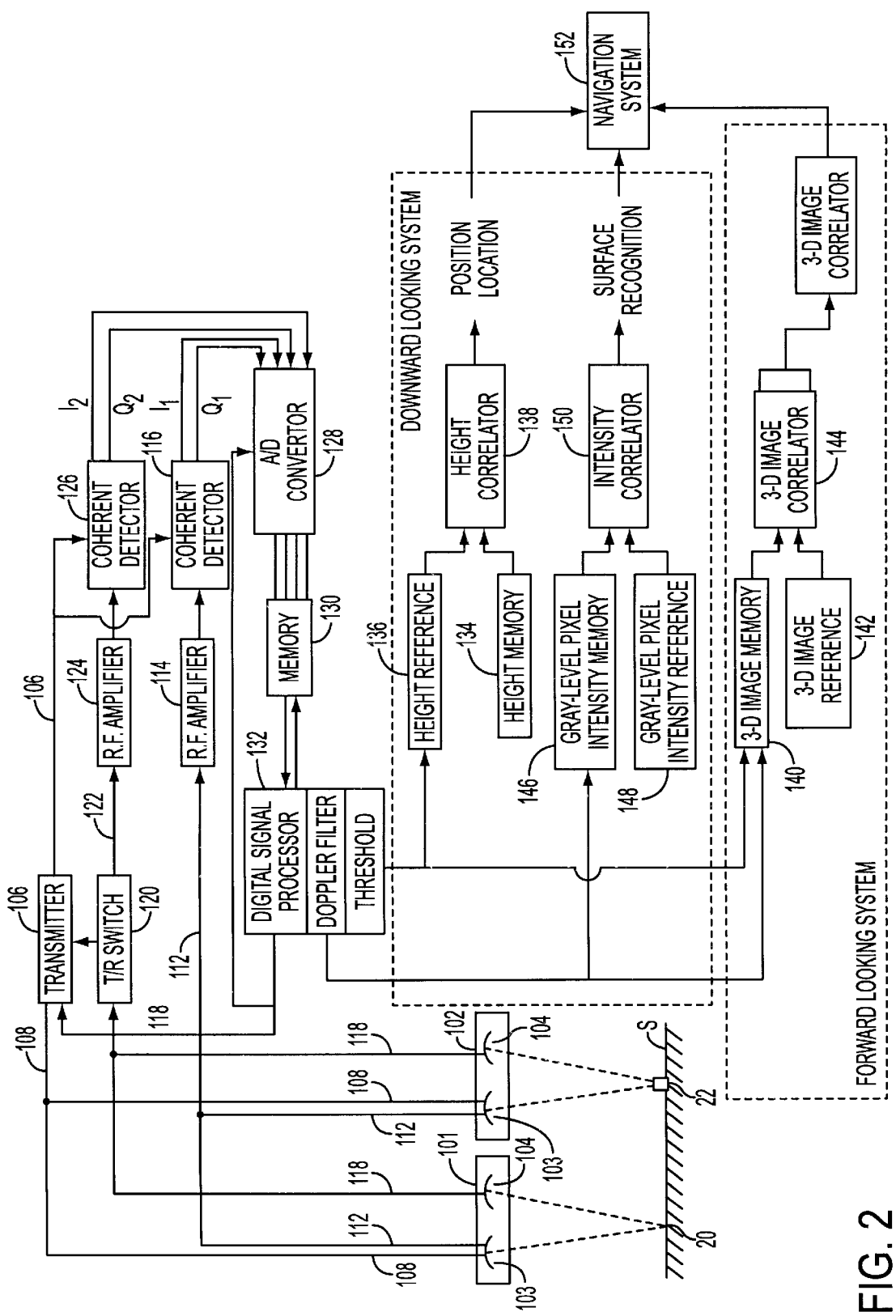
FIG. 2 is a system level diagram illustrating the principle components of the present invention.

A preferred system-level architecture of the present invention is provided in FIG. 2. The apparatus 100 includes a first antenna assembly 101, which is directed to transmit energy to and receive reflections from a surface location 20 located substantially beneath the airborne platform 10 carrying the apparatus 100. A second antenna assembly 102 is oriented to transmit energy forward-looking with a squint angle in azimuth and elevation from the airborne vehicle, such that the energy is reflected off a target area 22 located remote from the surface location 20 and is received by the second antenna assembly 102. Each of the antenna assemblies 101 and 102 includes first and second antennas 103 and 104, which are mounted side-by-side in the cross-track direction and separated by a distance, which is dependent upon the antenna aperture and operating frequency. Both antennas 103 and 104 serve as receivers while either one or both can transmit signals. The antenna assemblies 101 and 102 are coupled into a radar processor, having a transmitter 106 associated with at least one of the antennas of each antenna assembly 101 and 102 to transmit signals toward the surface location 20 and the target area 22. Thus, antenna 103 of the first antenna assembly 101 transmits a signal toward the surface location 20, which signal reflects off the surface location 20 and is received by both antenna 103 and 104 of the first antenna assembly 101. Similarly, antenna 103 of the second antenna assembly 102 transmits a signal toward the target area 22, which signal reflects off the target area 22 and is received by both antenna 103 and 104 of the second antenna assembly 102. Preferably, the apparatus 100 operates such that only one of the antenna assemblies, either 101 or 102 is operating at any given point in time. The signals received by the antenna assemblies may be used to determine both the position of the airborne platform 10 and the position of the target area 22, relative to the airborne platform 10.

The reflected signals received by antenna 103 of each antenna assembly are then sent via line 112 to a radio frequency (RF) amplifier 114 for amplification and signal conditioning and further processing by a first coherent detector 116. Detector 116 generates an in-phase component $I_1$ and a quadrature component $Q_1$ of the reflected signals that are detected by the first antennas 103 of the first and second antenna assemblies 101 and 102. Similarly, the second antenna 104 of each antenna assembly 101 and 102 detects the signals reflected from the surface location 20 and the target are 22, respectively, which signals are then carried by line 118 via a transmit/receive switch 120, via line 122 to an RF amplifier 124 which amplifies and conditions the received signal and provides it to a second coherent detector 126. The second coherent detector 126 also generates in-phase and quadrature components $I_2$, $Q_2$ of the detected, reflected signals.

The in-phase and quadrature analog components are provided to an analog-to-digital (A/D) converter 128, which converts the analog signals into digital signals stored in a memory 130. Memory 130 contains all of the information required to establish magnitude and phase of the return collected in two channels (112 and 122) slightly separated in space and therefore phase. Synthetic aperture processing in the digital signal processor 132 provides the means for extracting the three dimensional location and the intensity of subelements (pixels) in the target area 22 and surface locations 20. This is accomplished by standard techniques called Doppler, range and interferometric processing. The data stored in the memory 130 is arranged such that the digital signal processor 132 can identify whether the information is associated with reflections from the surface location 20 or the target area 22.

The position of the airborne platform 10 may be determined as follows. The processor 132 processes in real-time the digital information stored in the memory 130 to determine the range and the cross-track offset of the surface location 20. A Doppler filter is applied to each range gate of the return signal from antenna 103 or the sum of the returns from antennas 103 and 104 as the airborne platform moves between two points. The resultant signal, which is the Doppler interval directly below the radar, is thresholded to determine the time delay of the first return. The range to the surface location 20 is computed from this time delay and stored into height memory 134. Thus, the height memory 134 includes the height of the airborne platform 10 off the surface location 20. The phase angles of the signals received at the two antennas 103 and 104 are computed using the quadrature components of these Doppler filtered signals at the threshold crossing. The difference between these phase angles is used to compute the elevation angle of the range vector to the surface location 20. The terrain height and the cross-track offset are then computed using the range, the elevation angle and the barometric altitude of the airborne platform 10. A series of these sensed terrain height measurements are collected as the platform moves. Based on this information, the three dimensional position location of the airborne platform 10 may be computed using a stored reference as discussed below.

The three-dimensional position of the target area 22 may be computed as follows. The apparatus 100 includes a height reference 136, which defines a signature of surface areas that include the surface location 20 beneath the airborne platform 10 and the target area 22. A correlator 138 receives inputs from the height memory 134 and the height reference 136 and correlates the information to determine the location of the position of the airborne platform 10. In a similar fashion, when receiving inputs from the antenna assembly 102 oriented to the target area 22, the correlator 138 determines the three-dimensional location of the target area 22. Based on the position location of the airborne platform 10 and the three-dimensional location of the target area 22, a navigation system 152 associated with the airborne platform 10 may calculate the position of the airborne platform relative to the target area 22 without the need for any additional sensing devices or GPS.

The apparatus 100 of the present invention may also include features designed to improve the determination of the present location of the airborne platform 10 based on radar imagery. For example, as shown in FIG. 2, the two-dimensional radar image obtained from the signals reflected from the first antenna assembly 101 oriented toward the surface location 20 beneath the airborne platform 10 may be stored into a gray-level image memory 146. An intensity matcher 150 may then compare the images stored in the gray-level image memory 146 with geolocated images of the surface generated off-line and stored into a gray-level image reference 148. The intensity matcher 150 may then perform a pixel-by-pixel compare until a match is successfully found. The pixel-by-pixel comparison my be made by such known processes as a correlator, binary correlator, mean-squared-difference or mean-absolute-difference algorithm. This recognition result may be used by the navigation system 152 as another source to assist in determining the position of the airborne platform 10.

The three dimensional position of the target area 22 is computed in the same way as the three dimensional position for the surface location 20. The main difference is that instead of directing the transmit energy downward to the surface beneath the vehicle, the energy from the antenna assembly is directed the forward mode towards the target area. Again the resulting terrain height data is stored in image memory 140 and is correlated against the stored height reference found in the image reference 142. Also, using standard SAR image formation techniques, the I and Q data collected by the sensor are used to create a gray scale image of the target area. This gray scale image of the target area is co-registered to the computed terrain height elevation data in image memory 140. The image is correlated to the gray scale image reference stored in 142. In this way the three dimensional image correlator 144 matches in both intensity and in height using standard practices in each of the two domains. These practices may be, but not limited to, a standard correlation process, mean-absolute difference, mean-squared-difference, edge-match algorithms or other known techniques.

The resolution (i.e., pixel size) of the radar return signals processed and stored into the image memory 140 and the gray-level image memory 146 may be set to meet particular application requirements, typically five feet by five feet. Preferably, the resolution of the image stored in the three-dimensional image reference 142 and intensity reference 148 is set to the same resolution as the radar return signals.

In another embodiment of the present invention, a single antenna assembly, capable of scanning between at least two locations (the surface location 20 beneath the airborne platform 10 and the target area 22) may be used in place of two separate antenna assemblies. In such an embodiment, the apparatus 10 includes sufficient processing to control the antenna pointing process.

The techniques of determining the location of the airborne platform 10 relative to the target area 22 based on terrain height information and gray-level images may be used for a variety of purposes, such as navigation update, relative target location, object/obstacle location, surface description, moving target tracking, change detection, visualization, as well as a means for precision location and attack of a selected target within the target area. For example, the navigation system associated with the airborne platform 10 may contain an inertial navigation system (INS) that is responsible for keeping track of the position of the airborne platform, but which may have drifted (i.e., created an error) over time. The error in the INS position may be then corrected by the results of the present invention.

Although the present invention has been described in considerable detail with reference to certain presently preferred embodiments thereof, other embodiments are possible without departing from the spirit and scope of the present invention. Therefore the appended claims should not be limited to the description of the preferred versions contained herein.

What is claimed is:

1. An apparatus for determining a three-dimensional location of an airborne platform relative to a target area comprising:

(a) a first antenna assembly positioned at the airborne platform and adapted to transmit energy downward toward a surface location directly beneath the airborne platform;

(b) a second antenna assembly positioned at the airborne platform and adapted to transmit energy forwards toward the target area remote from the surface location;

(c) a transmitter associated with the first and second antenna assemblies for transmitting signals toward the surface location and the target area;

(d) a receiver coupled to the first and second antenna assemblies to receive and detect signals corresponding to the transmitted energy as reflected by the target area and the surface location;

(e) a radar processor coupled to the receiver adapted to determine elevation measurements of the surface location beneath the airborne platform and three-dimensional heights of the target area from the detected signals, and to extract two-dimensional gray scale imagery of the target area from the detected signals;

(f) geolocated, stored references of terrain heights of the surface location and target area;

(g) a geolocated, stored reference of two-dimensional gray scale imagery of the target area, co-registered to the associated terrain height reference;

(h) a height correlator for correlating the range between the platform and the surface location, and the three-dimensional height of the target area, to the stored reference of terrain heights;

(i) an image correlator for correlating the extracted two-dimensional gray scale imagery of the target area to the stored reference of two-dimensional gray scale imagery; and (j) a navigational processor for determining the three-dimensional location of the platform relative to the target area based on the correlation results of the height correlator and the image correlator.

2. The apparatus of claim 1 wherein each of the first and second antenna assemblies comprises a first and a second antenna and wherein the radar processor comprises:

(a) a first coherent detector associated with the first antenna of both antenna assemblies for detecting a received signal corresponding to the transmitted signal as reflected by the surface location or the target area and for generating an in-phase and a quadrature component of the detected signal relative to the received signal;

(b) a second coherent detector associated with the second antenna of both antenna assemblies for detecting a received signal corresponding to the transmitted signal as reflected by the surface location or the target area and for generating an in-phase and a quadrature component of the detected signal relative to the received signal;

(c) a memory; and (d) an analog-to-digital converter for converting the in-phase and quadrature components into digital information stored in the memory;

wherein the radar processor processes the digital information stored in the memory to determine the range between the airborne platform and the surface location beneath the airborne platform and the three-dimensional height of the target area.

3. The apparatus of claim 1 wherein the radar processor is further adapted to extract gray-level imagery of the target area from the detected signals, the apparatus further comprising:

(a) a geolocated, stored reference of gray-level imagery of the surface location; and (b) a gray-level image correlator for correlating the extracted gray-level imagery of the surface location to the stored reference of gray-level imagery;

wherein the navigational processor determines the three-dimensional location of the platform relative to the target area based on the correlation results of the height correlator, the image correlator, and the gray-level image correlator.

4. The apparatus of claim 1 wherein the radar processor computes a crosstrack offset of the target area relative to the platform.

5. The apparatus of claim 4 wherein the radar processor computes the crosstrack offset of the target area relative to the platform using interferometric phase measurement processing.

6. The apparatus of claim 1 wherein the radar processor determines the three-dimensional height of the target area using the signals detected from the second antenna assembly by doppler filtering at a threshold crossing.

7. The apparatus of claim 1 wherein the location of the platform relative to the target area is used to update the current navigational position of the platform.

8. An apparatus for determining a three-dimensional location of an airborne platform relative to a target area comprising:

(a) an antenna assembly positioned at the airborne platform and adapted to transmit energy both downward toward a surface location directly beneath the airborne platform and downward and forward toward the target area remote from the surface location;

(b) a transmitter associated with the antenna assembly for transmitting signals toward the surface location and the target area;

(c) a receiver coupled to the antenna assembly to receive and detect signals corresponding to the transmitted energy as reflected by the target area and the surface location;

(d) a radar processor coupled to the receiver adapted to determine elevation measurements of the surface location beneath the airborne platform and three-dimensional heights of the target area from the detected signals, and to extract two-dimensional gray scale imagery of the target area from the detected signals;

(e) geolocated, stored references of terrain heights of the surface location and target area;

(f) a geolocated, stored reference of two-dimensional gray scale imagery of the target area, co-registered to the associated terrain height reference;

(g) a height correlator for correlating the range between the platform and the surface location, and the three-dimensional height of the target area, to the stored reference of terrain heights;

(h) an image correlator for correlating the extracted two-dimensional gray scale imagery of the target area to the stored reference of two-dimensional gray scale imagery; and (i) a navigational processor for determining the three-dimensional location of the platform relative to the target area based on the correlation results of the height correlator and the image correlator.

* * * * *